United States Patent
Muramoto et al.

(10) Patent No.: US 8,393,792 B2
(45) Date of Patent: Mar. 12, 2013

(54) BEARING DEVICE

(75) Inventors: Yukitaka Muramoto, Toyota (JP); Masaru Kondo, Toyota (JP); Yasuaki Goto, Toyota (JP); Masao Takahashi, Toyota (JP)

(73) Assignee: Taiho Kogyo Co., Ltd., Toyota-shi, Aichi (JP)

( * ) Notice: Subject to any disclaimer, the term of this patent is extended or adjusted under 35 U.S.C. 154(b) by 698 days.

(21) Appl. No.: 12/592,915

(22) Filed: Dec. 4, 2009

(65) Prior Publication Data

US 2010/0247011 A1    Sep. 30, 2010

(30) Foreign Application Priority Data

Mar. 31, 2009  (JP) .................................. 2009-087095

(51) Int. Cl.
*F16C 17/04*       (2006.01)

(52) U.S. Cl. ........................................ 384/429; 384/432

(58) Field of Classification Search .................. 384/273, 384/294, 420, 428, 429, 430, 432–434, 457
See application file for complete search history.

(56) References Cited

U.S. PATENT DOCUMENTS

| 4,133,586 | A  | * | 1/1979 | Maurer | .......................... 384/429 |
| 2007/0081748 | A1 | * | 4/2007 | Sitter | ............................ 384/294 |

FOREIGN PATENT DOCUMENTS

JP          1-106618         7/1989

* cited by examiner

*Primary Examiner* — Phillip A Johnson
(74) *Attorney, Agent, or Firm* — Flynn, Thiel, Boutell & Tanis, P.C.

(57) ABSTRACT

In a bearing device 1, annular recesses 3a and 6a that house a thrust bearing 7 are formed in side surfaces of a housing 3 and a cap 6, a rotation preventing protrusion 12b is provided in an outer periphery of a lower side half-split thrust bearing 12 in the thrust bearing 7, and a rotation preventing groove 6b into which the rotation preventing protrusion 12b fits is formed in the annular recess 6a formed in the cap 6.

2 Claims, 3 Drawing Sheets

BEARING DEVICE

FIELD OF THE INVENTION

The present invention relates to a bearing device, and more particularly to a bearing device including a ring-shaped thrust bearing that comes into sliding contact with a crank arm of a crankshaft.

DESCRIPTION OF THE PRIOR ART

Conventionally, a bearing device is known including: two half-split main bearings that journal a journal of a crankshaft; a housing that holds one of the half-split main bearings; a cap that is secured to the housing and holds the other of the half-split main bearings; and a ring-shaped thrust bearing that is provided on side surfaces of the housing and the cap, surrounds the journal, and comes into sliding contact with a crank arm of the crankshaft.

As such a bearing device, a bearing device is known in which an annular recess that houses the thrust bearing is formed in the side surfaces of the housing and the cap, a rotation preventing protrusion is provided on an outer periphery of the thrust bearing, and a rotation preventing groove into which the rotation preventing protrusion fits is formed in the annular recess (Japanese Utility Model Laid-Open No. 1-106618).

If the rotation preventing groove is formed in the side surfaces of the housing and the cap in separate processes, a shallower rotation preventing groove than the annular recess may be formed.

Then, when the thrust bearing receives a load in a thrust direction from the crank arm, the rotation preventing protrusion protrudes toward the crank arm, and partial contact of the rotation preventing protrusion with the crank arm prevents sufficient sliding performance from being obtained.

On the other hand, with a deeper rotation preventing groove than the annular recess, when the thrust bearing receives the load in the thrust direction from the crank arm or oil film pressure, stress may concentrate on a portion overlapping the rotation preventing groove to break the portion.

SUMMARY OF THE INVENTION

In view of such problems, the present invention provides a bearing device that can prevent partial contact of a thrust bearing, and prevent breakage due to stress concentration as much as possible.

Specifically, the present invention provides a bearing device including: two half-split main bearings that journal a journal of a crankshaft; a housing that holds one of the half-split main bearings; a cap that is secured to the housing and holds the other of the half-split main bearings; and a ring-shaped thrust bearing that is provided on side surfaces of the housing and the cap, surrounds the journal, and comes into slide contact with a crank arm of the crankshaft, an annular recess that houses the thrust bearing being formed in the side surfaces of the housing and the cap, a rotation preventing protrusion being provided on an outer periphery of the thrust bearing, and a rotation preventing groove into which the rotation preventing protrusion fits being formed in the annular recess, wherein the rotation preventing groove is formed to be deeper than the annular recess, and a groove is formed from the rotation preventing protrusion to an inner peripheral portion of the thrust bearing in a surface of the thrust bearing on the side of the crank arm.

DETAILED DESCRIPTION OF THE EMBODIMENTS

Figure 1:
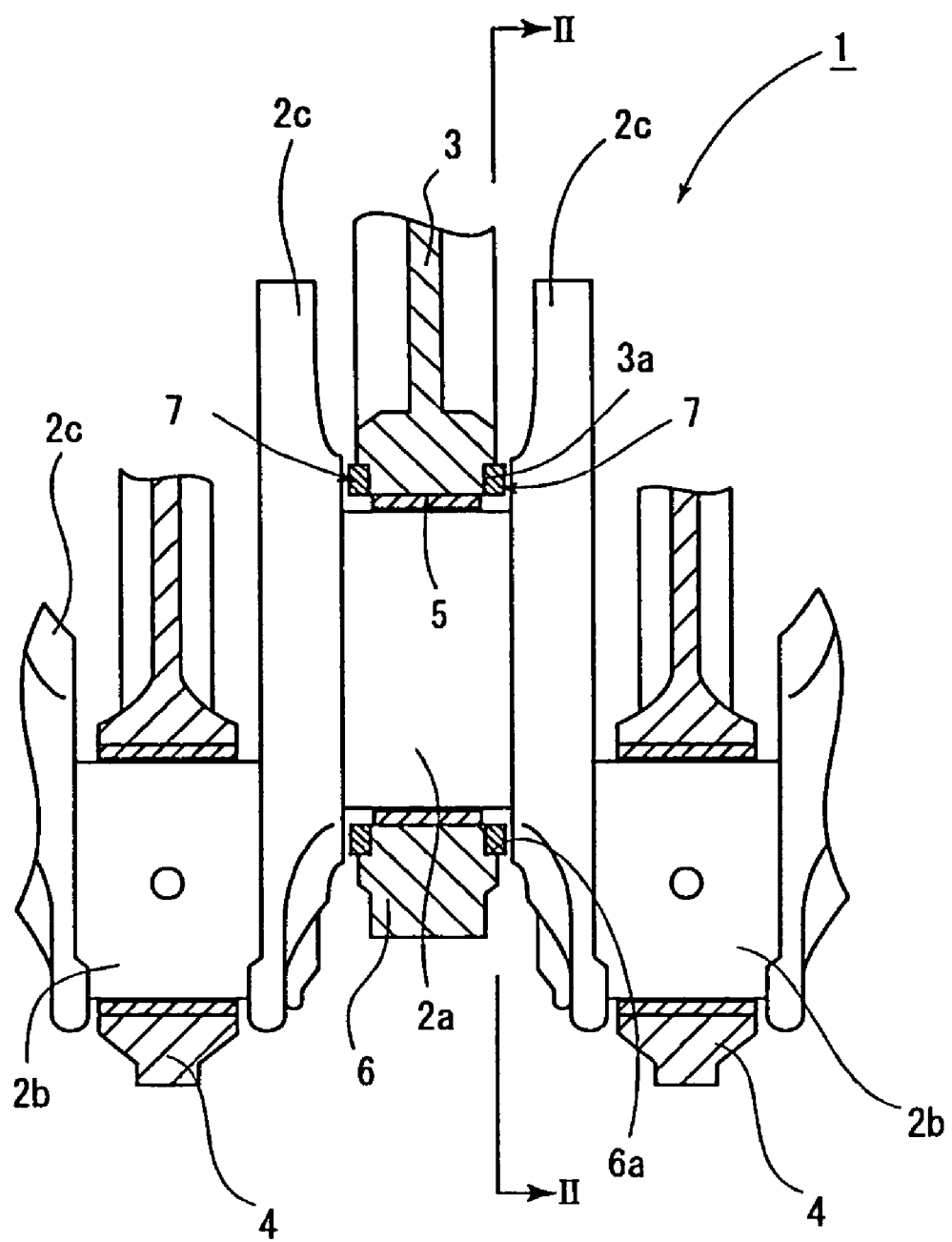
FIG. 1 is a sectional side view of a bearing device according to an embodiment.

Now, a shown embodiment will be described. FIG. 1 shows a bearing device 1 of an engine, and shows a crankshaft 2, a housing 3 provided in a cylinder block that journals the crankshaft 2, and a connecting rod 4 connected to an unshown piston.

The crankshaft 2 includes a plurality of journals 2a journaled by the housing 3, a plurality of crank pins 2b rotatably connected to the connecting rod 4, and crank arms 2c that connect and hold the journals 2a and the crank pins 2b in an offset state.

The crankshaft 2 is journaled by a main bearing 5 provided in the housing 3, and the main bearing 5 includes an upper side half-split main bearing 5a held at a tip of the housing 3 in the cylinder block, and a lower side half-split main bearing 5b held by a cap 6 secured to the tip of the housing 3.

For example, for a serial four-cylinder engine, a ring-shaped thrust bearing 7 that surrounds the journal 2a and comes into sliding contact with the crank arm 2c is provided on the side surfaces of the housing 3 and the cap 6 placed at the center.

The thrust bearing 7 receives a load in a thrust direction from the crank arm 2c by the crankshaft 2 being axially moved by an intermittent clutch or the like.

Figure 2:
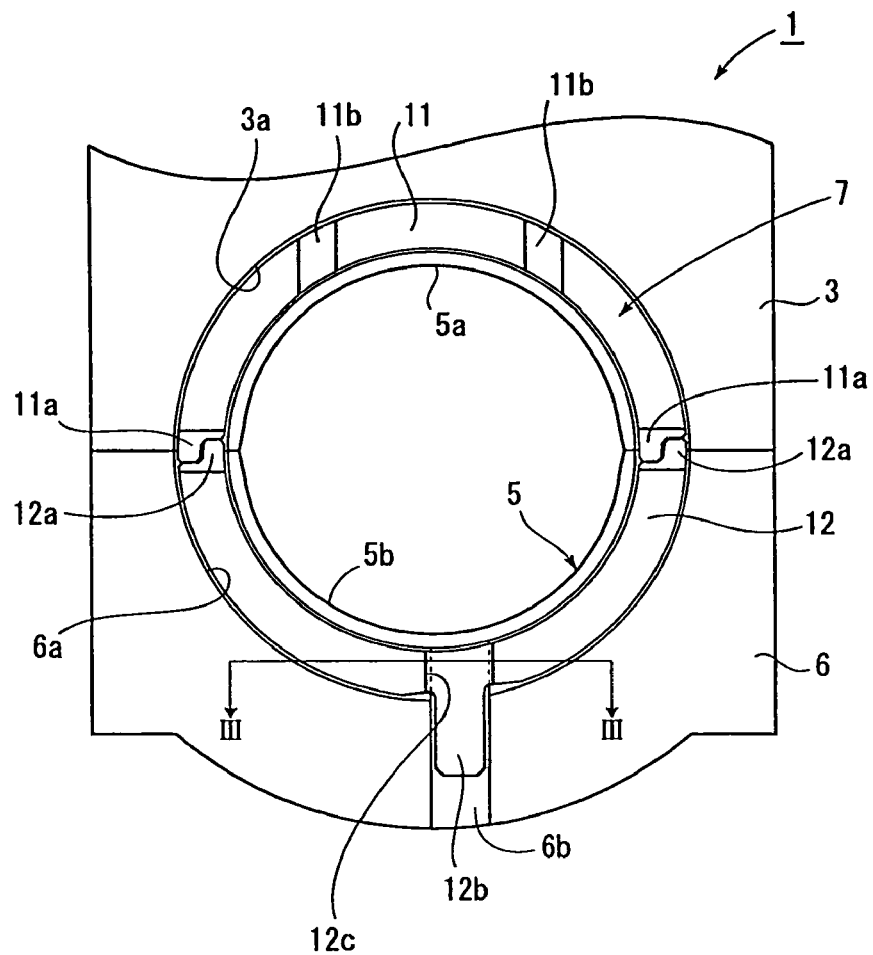
FIG. 2 is a view taken along the line II-II in FIG. 1.

FIG. 2 is a view taken along the line II-II in FIG. 1. The thrust bearing 7 includes an upper side half-split thrust bearing 11 provided on the side of the housing 3, and a lower side half-split thrust bearing 12 provided on the side of the cap 6. To hold the thrust bearing 7, annular recesses 3a and 6a are formed in the side surfaces of the housing 3 and the cap 6.

Lining layers are formed on surfaces of the upper side half-split thrust bearing 11 and the lower side half-split thrust bearing 12 on the side of the crank arm 2c, and the lining layers come into slide contact with the crank arm 2c.

Upper side engaging portions 11a are provided at opposite ends of the upper side half-split thrust bearing 11, and two oil grooves 11b passing through from an inner periphery to an outer periphery are formed in the surface on the side of the crank arm 2c.

The oil groove 11b supplies a lubricant supplied between the journal 2a and the main bearing 5 to between the thrust bearing 7 and the crank arm 2c.

Lower side engaging portions 12a are provided at opposite ends of the lower side half-split thrust bearing 12, and further, a rotation preventing protrusion 12b is provided on an outer periphery of the lower side half-split thrust bearing 12.

The upper side engaging portion 11a shown on the left is a protrusion formed on an outer peripheral side of the upper side half-split thrust bearing 11, and the lower side engaging portion 12a shown on the left and engaging the upper side engaging portion 11a is a protrusion formed on an inner peripheral side of the lower side half-split thrust bearing 12.

Meanwhile, the upper side engaging portion 11a shown on the right is a protrusion formed on an inner peripheral side of the upper side half-split thrust bearing 11, and the lower side engaging portion 12a shown on the right and engaging the upper side engaging portion 11a is a protrusion formed on an outer peripheral side of the lower side half-split thrust bearing 12.

Further, the upper side engaging portion 11a and the lower side engaging portion 12a each have a gradually tapered slope to a thin tip.

The upper side engaging portion 11a and the lower side engaging portion 12a are conventionally known, and besides the above-described protrusion shape, the upper side half-split thrust bearing 11 and the lower side half-split thrust bearing 12 can be engaged with each other with various shapes.

The rotation preventing protrusion 12b is provided in a position offset from the center of the lower side half-split thrust bearing 12, and the centerline thereof protrudes diagonally to a line passing through the center of the thrust bearing 7.

In the annular recess 6a in the cap 6, a rotation preventing groove 6b into which the rotation preventing protrusion 12b fits is formed, and the rotation preventing groove 6b is formed to pass through from an outer periphery to an inner periphery of the cap 6.

To work the rotation preventing groove 6b, it is only necessary that the annular recess 6a is worked on the side surface of the cap 6, and then the rotation preventing groove 6b is worked so as to cross the annular recess 6a.

The rotation preventing groove 6b is provided in a position offset from the center of the thrust bearing 7 like the rotation preventing protrusion 12b. The upper side half-split thrust bearing 11 and the lower side half-split thrust bearing 12 are combined by the upper side engaging portion 11a, the lower side engaging portion 12a, and the rotation preventing protrusion 12b, and thus the lining layers reliably appear on the side of the crank arm 2c when the thrust bearing 7 is assembled to the bearing device 1, thereby preventing poor assembling.

Figure 3:
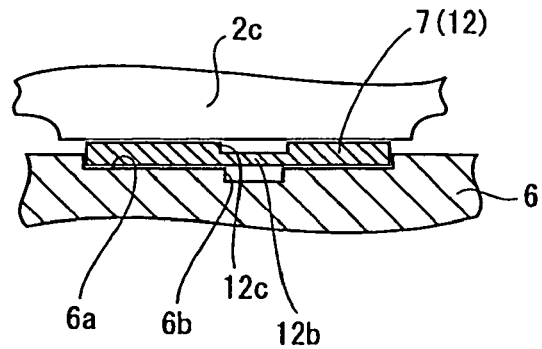
FIG. 3 is a sectional view taken along the line III-III in FIG. 2.

The bearing device 1 of this embodiment has the below-described configuration as shown in FIG. 3.

First, the rotation preventing groove 6b of the cap 6 is formed to be deeper than the annular recess 6a. This can be achieved in such a manner that the rotation preventing groove 6b is formed to be deeper than the annular recess 6a.

Then, in the surface of the lower side half-split thrust bearing 12 on the side of the crank arm 2c, a groove 12c is formed from the rotation preventing protrusion 12b to an inner peripheral portion of the lower side half-split thrust bearing 12, and the groove 12c is formed to be wider than the rotation preventing groove 6b.

In other words, the rotation preventing protrusion 12b and the groove 12c are formed in a position overlapping the rotation preventing groove 6b formed in the cap 6, and along therewith, the rotation preventing protrusion 12b has the same thickness as a portion formed with the groove 12c in the inner peripheral portion of the lower side half-split thrust bearing 12.

With the thrust bearing 7 having the above-described configuration, the below-described advantages can be obtained.

First, the rotation preventing groove 6b in the cap 6 is formed to be deeper than the annular recess 6a, thereby providing satisfactory slide performance.

As described above, when the annular recess 6a and the rotation preventing groove 6b are worked in separate processes in producing the cap 6, the rotation preventing groove 6b is sometimes formed to be shallower than the annular recess 6a for any reason even if the annular recess 6a and the rotation preventing groove 6b are to be formed to have the same depth.

When the thrust bearing 7 receives a load in a thrust direction from the crank arm 2c in this state, the portion of the lower side half-split thrust bearing 12 overlapping the rotation preventing groove 6b protrudes toward the crank arm 2c, and thus partial contact causes poor sliding performance or a reduction in durability.

On the other hand, the rotation preventing groove 6b is formed to be deeper than the annular recess 6a, and thus the portion of the lower side half-split thrust bearing 12 overlapping the rotation preventing groove 6b is deformed toward a bottom of the rotation preventing groove 6b by the thrust load from the crank arm 2c. This does not cause partial contact, and provides satisfactory sliding performance and increases durability.

Next, the groove 12c is formed on the side of the crank arm 2c of the thrust bearing 7, and this can prevent stress concentration on the portion overlapping the rotation preventing groove 6b by the load in the thrust direction from the crank arm 2c, and prevent breakage of the thrust bearing 7.

First, when the thrust bearing 7 receives the load in the thrust direction from the crank arm 2c, oil film pressure by the lubricant interposed between the thrust bearing 7 and the crank arm 2c actually acts on a sliding surface of the thrust bearing 7.

In this embodiment, the rotation preventing groove 6b of the cap 6 is formed to be deeper than the annular recess 6a. Thus, when the groove 12c is not formed in the lower side half-split thrust bearing 12, the oil film pressure causes stress for deformation toward the bottom of the rotation preventing groove 6b in the portion overlapping the rotation preventing groove 6b, and repeated acting of the oil film pressure may cause fatigue damage of the lower side half-split thrust bearing 12.

On the other hand, the groove 12c is formed as in this embodiment to reduce the oil film pressure acting on the rotation preventing protrusion 12b and the groove 12c and reduce stress on the portion, thereby preventing fatigue damage of the lower side half-split thrust bearing 12 as much as possible.

Further, the groove 12c is formed to be wider than the rotation preventing groove 6b, thereby further reducing stress concentrating near an opening edge of the rotation preventing groove 6b in the thrust bearing 7, and more effectively preventing fatigue damage.

A conventional thrust bearing 7 is known in which an oil groove like the oil groove 11b in the upper side half-split thrust bearing 11 is also formed in the lower side half-split thrust bearing 12. The groove 12c can be also used as this oil groove, and it is allowed that a separate oil groove is not formed in the lower side half-split thrust bearing 12.

Figure 4:
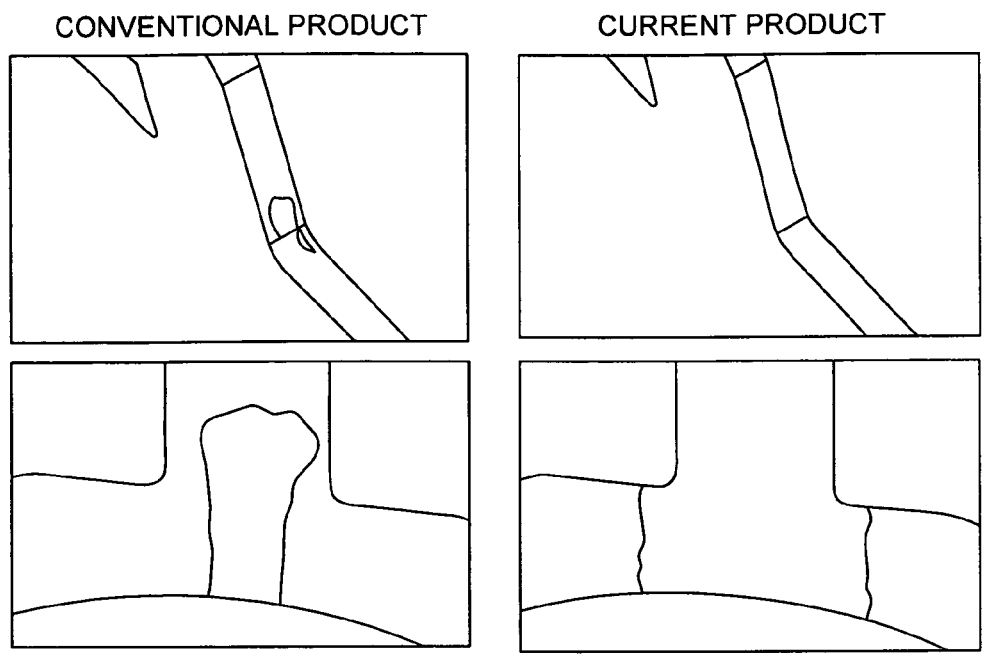
FIG. 4 shows simulation results.

FIG. 4 illustrates simulation results performed for the thrust bearing 7 (hereinafter referred to as the invention product) formed with the groove 12c in this embodiment, and a thrust bearing 7 (hereinafter referred to as a conventional product) without the groove 12c.

In the simulation, conditions were the same except the presence of the groove 12c, and particularly, the rotation preventing groove 6b in the unshown cap 6 was set to be deeper than the annular recess 6a both in the invention product and the conventional product.

In the simulation, a load of 67.38 kN is applied to a slide surface on the side of the crank arm in the thrust bearing, and stress generated in the thrust bearing 7 was measured.

It turned out that in the conventional product, stress concentrates on the portion overlapping the rotation preventing groove 6b and a base portion of the rotation preventing protrusion 12b, and there was stress concentration of 958 MPa maximum.

On the other hand, in the invention product, there was no portion on which stress concentrates, and there was stress concentration of only about 6 MPa maximum.

From the above, it was confirmed that the invention product is less likely to undergo fatigue damage by the load from the crank arm or oil film pressure as compared with the conventional product.

Figure 5:
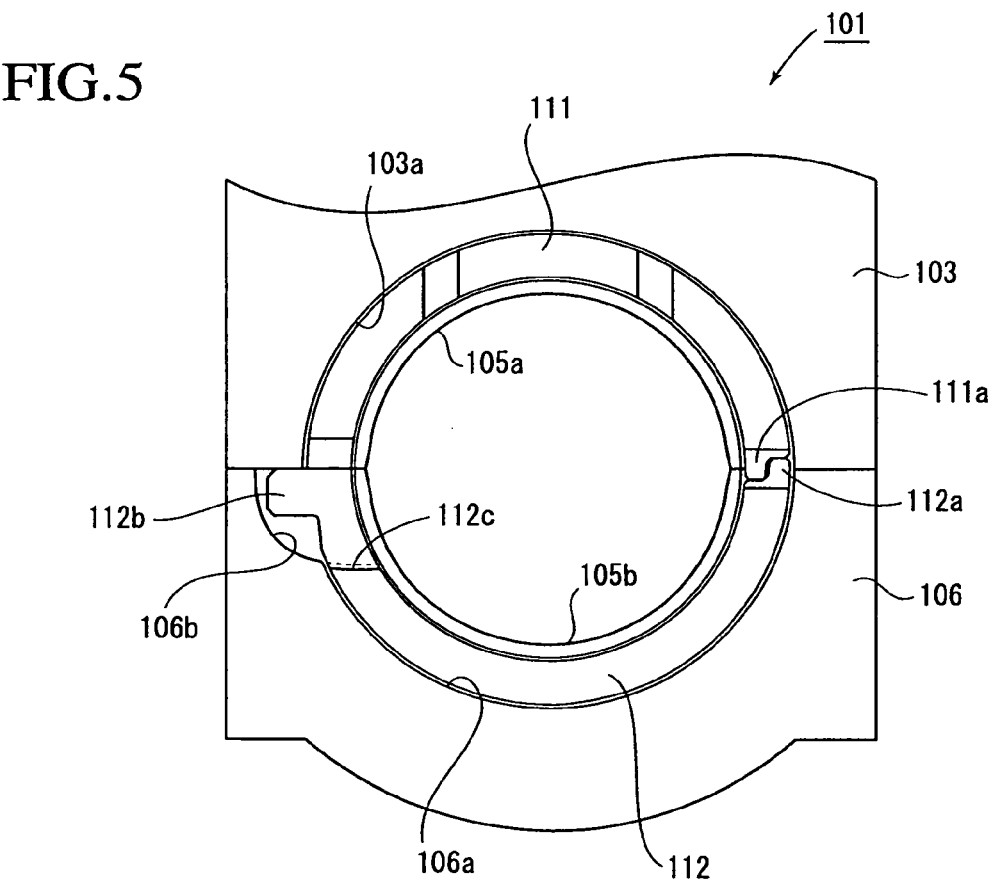
FIG. 5 shows another embodiment.

FIG. 5 shows a bearing device 101 of a second embodiment according to the present invention. The same members as in the first embodiment will be described with 100 added to the reference numerals used in the first embodiment.

In an upper side half-split thrust bearing 111 of a thrust bearing 107 in this embodiment, an upper side engaging portion 111a is provided on the right in the drawing and a gradually tapered slope to a thin tip is formed at the left end in the drawing.

In a lower side half-split thrust bearing 112, a lower side engaging portion 112a is provided on the right in the drawing, and a rotation preventing protrusion 112b is provided toward an outer periphery on the left in the drawing.

On the left in the drawing of an annular recess 106a in a cap 106, a rotation preventing groove 106b into which the rotation preventing protrusion 112b fits is formed, and the rotation preventing groove 106b is formed to be deeper than the annular recess 106a.

In the lower side half-split thrust bearing 112, a groove 112c wider than the rotation preventing groove 106b is formed. Specifically, a wider range portion than the rotation preventing groove 106b including the rotation preventing protrusion 112b is formed to be thin.

As in this embodiment, the position of the rotation preventing protrusion 112b in the thrust bearing 107 can be arbitrarily set, and the groove 112c is set to be wider than the rotation preventing groove 106b formed depending on the position of the rotation preventing protrusion 112b, thereby obtaining the same advantage as in the first embodiment.

In the embodiments, the rotation preventing protrusion is provided in the lower side half-split thrust bearing, but may be provided in the upper side half-split thrust bearing, and along therewith, the rotation preventing groove may be formed in the housing.

The grooves 12b and 112b may have trapezoidal or arcuate sectional shapes.

What is claimed is:

1. A bearing device comprising:
   two half-split main bearings that journal a journal of a crankshaft;
   a housing that holds one of the half-split main bearings;
   a cap that is secured to said housing and holds the other of the half-split main bearings; and
   a ring-shaped thrust bearing that is provided on side surfaces of said housing and said cap, surrounds said journal, and comes into sliding contact with a crank arm of said crankshaft,
   an annular recess that houses said thrust bearing being formed in the side surfaces of said housing and said cap,
   a rotation preventing protrusion being provided on an outer periphery of said thrust bearing, and a rotation preventing groove into which said rotation preventing protrusion fits being formed in said annular recess,
   wherein said rotation preventing groove is formed to be deeper than said annular recess, and a groove is formed from the rotation preventing protrusion to an inner peripheral portion of the thrust bearing in a surface of said thrust bearing on a side of the crank arm.

2. The bearing device according to claim 1, wherein said groove formed from the rotation preventing protrusion of said thrust bearing to the inner peripheral portion of the thrust bearing has a wider width than said rotation preventing groove.

* * * * *